(12) United States Patent
Pepitone et al.

(10) Patent No.: US 8,972,082 B2
(45) Date of Patent: Mar. 3, 2015

(54) AIRCRAFT FLIGHT DECK DISPLAYS AND SYSTEMS AND METHODS FOR DISPLAYING INTEGRATED MINIMUM SAFE ALTITUDE AND MINIMUM VECTORING ALTITUDE INFORMATION ON A DISPLAY DEVICE IN AN AIRCRAFT

(71) Applicant: Honeywell International Inc., Morristown, NJ (US)

(72) Inventors: Dave Pepitone, Sun City West, AZ (US); Ratan Khatwa, Sammamish, WA (US); Roger W. Burgin, Scottsdale, AZ (US); Jerry Ball, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/950,636

(22) Filed: Jul. 25, 2013

(65) Prior Publication Data

US 2015/0032298 A1     Jan. 29, 2015

(51) Int. Cl.
| | |
|---|---|
| *G05D 1/00* | (2006.01) |
| *G01C 21/00* | (2006.01) |
| *G01C 5/00* | (2006.01) |
| *B64D 43/00* | (2006.01) |

(52) U.S. Cl.
CPC ............... *G01C 5/005* (2013.01); *B64D 43/00* (2013.01)
USPC .............................................. 701/4; 340/973

(58) Field of Classification Search
USPC .............................................. 701/4; 340/973
See application file for complete search history.

(56) References Cited

U.S. PATENT DOCUMENTS

| | | | |
|---|---|---|---|
| 4,646,244 A * | 2/1987 | Bateman et al. | 701/301 |
| 6,505,102 B2 * | 1/2003 | Morizet et al. | 701/3 |
| 7,672,758 B2 | 3/2010 | Astruc | |
| 7,783,393 B2 | 8/2010 | Tucker et al. | |
| 8,032,268 B2 | 10/2011 | Burgin et al. | |
| 8,078,344 B2 | 12/2011 | Dwyer et al. | |
| 8,121,746 B2 * | 2/2012 | Francois et al. | 701/4 |
| 8,185,301 B1 | 5/2012 | Simon | |
| 8,374,776 B2 | 2/2013 | Spencer, V | |

(Continued)

OTHER PUBLICATIONS

EP Extended Search Report for Application No. 14177349.9 dated Dec. 11, 2014.

(Continued)

*Primary Examiner* — Thomas G Black
*Assistant Examiner* — Tyler Paige
(74) *Attorney, Agent, or Firm* — Ingrassia Fisher & Lorenz, P.C.

(57) ABSTRACT

A method is provided for displaying integrated minimum vectoring and safe altitude information on a display device in an aircraft. The method comprises displaying a graphical representation of a safe altitude sector and a vectoring altitude sector on the display device, and displaying a graphical representation of the aircraft on the display device to indicate the current location of the aircraft and a minimum altitude value associated therewith. The safe altitude sector corresponds to a first geographic area having a designated minimum safe altitude value associated therewith. The vectoring altitude sector corresponds to a second geographic area having a designated minimum vectoring altitude value associated therewith that is below the designated minimum safe altitude value. The graphical representation of the aircraft is displayed within at least one of the graphical representation of the safe altitude sector and the graphical representation of the vectoring altitude sector.

20 Claims, 8 Drawing Sheets

(56) References Cited

U.S. PATENT DOCUMENTS

| | | | |
|---|---|---|---|
| 8,560,150 B1 * | 10/2013 | Phillips et al. | 701/16 |
| 8,583,368 B1 * | 11/2013 | Sindlinger et al. | 701/460 |
| 2003/0060945 A1 * | 3/2003 | Varon | 701/4 |
| 2009/0326742 A1 * | 12/2009 | Varon | 701/4 |
| 2010/0082186 A1 | 4/2010 | Burgin et al. | |
| 2011/0087428 A1 * | 4/2011 | Barnetche et al. | 701/200 |
| 2011/0199237 A1 | 8/2011 | Clark et al. | |
| 2011/0246065 A1 | 10/2011 | Spencer, V | |

OTHER PUBLICATIONS

N. N.: Charts Raise Pilot Awareness of Minimum Vectoring Altitudes Flight Safety, vol. 23, No. 9. Sep. 1, 2004, pp. 3-28, XP055154787.

* cited by examiner

AIRCRAFT FLIGHT DECK DISPLAYS AND SYSTEMS AND METHODS FOR DISPLAYING INTEGRATED MINIMUM SAFE ALTITUDE AND MINIMUM VECTORING ALTITUDE INFORMATION ON A DISPLAY DEVICE IN AN AIRCRAFT

TECHNICAL FIELD

The present invention generally relates to avionics systems, and more particularly relates to aircraft flight deck displays and systems and methods for displaying integrated minimum safe altitude (MSA), Terminal Arrival Area (TAA), and minimum vectoring altitude (MVA) information on a display device in an aircraft.

BACKGROUND

Vectoring is to navigationally guide an aircraft in flight by air traffic control (ATC) issuing appropriate headings, based on the use of an air traffic service (ATS) surveillance system (usually radar). The air traffic controller (ATCO) decides on a particular airfield traffic pattern for the aircraft to fly, composed of specific legs or vectors. Aircraft vectoring is used under special circumstances only, such as to vertically separate aircraft by a specified distance in densely traveled airspace. Vectoring is primarily used in the terminal environment where the aircraft is in close proximity to the ground. In other circumstances, vectoring may be used at a considerable altitude above the terrain.

The Minimum Vectoring Altitude (MVA) is the lowest altitude level to which ATCO may issue aircraft altitude clearances during vectoring, except if otherwise authorized for radar approaches, departures, and missed approaches. MVAs meet obstacle and terrain clearance requirements in the airspace within the maximum displayable range of the ATC radar system. MVA charts are developed for geographic areas near airports where there are numerous minimum altitude requirements due to variable terrain features and/or obstacles (collectively, "obstructions"). The responsible ATC facility determines the MVA chart design based on topography, obstruction data, and operational requirements in accordance with governmental regulations. The geographic area is subdivided into vectoring altitude sectors, each vectoring altitude sector having a designated MVA. While a MVA chart assumes a roughly circular shape, the MVA chart may be complicated because there is no prescribed limit on the size, shape, or orientation of the vectoring altitude sectors. Each vectoring altitude sector is large enough to accommodate the vectoring of aircraft therein at the MVA. Overall, the vectoring altitude sectors are designed with consideration of aircraft maneuvering ability, obstacle clearance requirements, and air traffic flow requirements. Each vectoring altitude sector boundary is at least a prescribed number of miles from the controlling obstruction used to determine the MVA in that vectoring altitude sector. In order to avoid cases of large altitude sectors with an excessively high MVA because of isolated prominent obstacles, the isolated obstacle or group of obstacles may be enclosed in an obstacle buffer area with boundaries that are a designated number of miles from the controlling obstruction(s). MVAs can be, and often are, below Minimum Safe Altitudes (MSAs).

MSAs are altitude levels that are also intended to ensure clearance over obstacles and terrain within a particular geographic area proximate to a route that an aircraft may travel during flight. The geographic area associated with MSAs is subdivided into safe altitude sectors. A portion of the MVA and MSA geographic areas may overlap. MSAs are often determined based on criteria provided by a governmental or regulatory organization. For instrument-based operations in accordance with instrument flight rules (IFR), MSAs are often published on aeronautical charts (known as MSA approach plates) for various airways, routes, and approaches for a given navigation reference point, and are provided to pilots. Pilots may also be provided with MSA or TAA information (collectively referred to herein as "MSA information") on display devices in an aircraft such as described in U.S. Pat. No. 8,032,268 issued Oct. 4, 2011 by the same named assignee, and incorporated by reference herein in its entirety. Unfortunately, MVA charts are not usually provided to flight crews on the flight deck. In addition, pilot reliance on conventional MVA charts would significantly increase cockpit workload because, in the event of a vectoring instruction, a pilot would have to interpret the MVA chart quickly during a period of high stress to gain critical MVA information. Furthermore, if conventional MVA charts were combined with MSA information on a display device, the resulting display would be confusing, with a tangle of sector lines and radials.

Therefore, while a pilot may be issued vectoring instructions that involve descending to an altitude that the pilot knows to be below the MSA (e.g., from a MSA approach plate), the pilot cannot independently verify that the altitude is above the MVA. The pilot has to rely solely on the ATCO who may have disregarded or been incorrect about the MVA. Moreover, that the pilot cannot independently verify that the altitude is above the MVA is the antithesis of the cross-checking processes that are critical in aviation. In addition, while the ultimate responsibility for the safety of the aircraft rests with the pilot who can refuse aircraft altitude clearances and vectoring instructions, the pilot does not have the necessary MVA information to know whether to refuse. As a result, the potential for obstacle and terrain avoidance when vectoring below the MSA may be compromised.

Accordingly, it is desirable to provide aircraft flight deck displays and systems and methods for displaying integrated minimum vectoring and safe altitude information on the display device in an aircraft. It is desired that the pilot may quickly and easily verify the MVA in the altitude sector in which own aircraft is located, thereby increasing pilot situational awareness, the potential for obstacle and terrain avoidance, and improving flight safety.

BRIEF SUMMARY

Methods are provided for displaying integrated minimum vectoring and safe altitude information on a display device in the aircraft. In accordance with one exemplary embodiment, a method for displaying integrated minimum vectoring and safe altitude information on a display device in an aircraft comprises displaying a graphical representation of a safe altitude sector on the display device. The safe altitude sector corresponds to a first geographic area having a designated minimum safe altitude value associated therewith. A graphical representation of a vectoring altitude sector is also displayed on the display device. The vectoring altitude sector corresponds to a second geographic area having a designated minimum vectoring altitude value associated therewith that is below the designated minimum safe altitude value. A graphical representation of the aircraft is displayed on the display device within at least one of the graphical representation of the safe altitude sector to indicate a current location of the aircraft and the minimum safe altitude value associated therewith or within the graphical representation of the vectoring altitude sector to indicate the current location of the aircraft and the minimum vectoring altitude value associated therewith.

Systems are provided for displaying integrated minimum vectoring and safe altitude information on a display device in the aircraft in accordance with yet another exemplary embodiment of the present invention. The system comprises a display device, a data storage device containing a database with minimum vectoring altitude information and minimum safe altitude information, and a display processor. The display processor is in operable communication with the display device and coupled to receive the minimum vectoring altitude information and the minimum safe altitude information and configured, in response thereto to generate a graphical representation of a safe altitude sector, generate a graphical representation of a vectoring altitude sector, and generate a graphical representation of the aircraft to indicate a current location of the aircraft and a minimum altitude value associated therewith. The graphical representation of the aircraft is generated within at least one of the graphical representation of the safe altitude sector or the graphical representation of the vectoring altitude sector.

Aircraft flight deck display devices are provided having rendered thereon a graphical display of a navigational map associated with a current location of an aircraft in accordance with yet another exemplary embodiment of the present invention. The graphical display comprises a safe altitude sector overlying the navigational map that corresponds to a first geographic area having a minimum safe altitude value and a vectoring altitude sector that corresponds to a second geographic area having a minimum vectoring altitude value. A portion of the safe altitude sector overlaps a portion of the vectoring altitude sector if there is a common geographic region in the first and second geographic areas. The overlapping portions correspond to the common geographic region. The graphic display further comprises an aircraft image within at least one of the graphical display of the safe altitude sector or the vectoring altitude sector overlying the navigational map, the aircraft image being positioned such that its position corresponds to the current location of the aircraft. The safe altitude sector is displayed with a first visually distinguishing characteristic if the aircraft is determined to be at risk of descending below the designated minimum safe altitude level for the safe altitude sector in which the aircraft is currently located. The vectoring altitude sector is displayed with a second visually distinguishing characteristic to indicate that the aircraft is below the designated minimum safe altitude for the safe altitude sector in which the aircraft is currently located and the aircraft is determined to be at risk of descending below the designated minimum vectoring altitude level for the vectoring altitude sector to which the aircraft is heading. The vectoring altitude sector is displayed using a third visually distinguishing characteristic to indicate that the aircraft is below the designated minimum vectoring altitude level for the vectoring altitude sector in which the aircraft is currently located.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to aircraft flight deck displays and systems and methods for displaying integrated minimum safe altitude (MSA) and minimum vectoring altitude (MVA) information on a display device in an aircraft. Such systems and methods enable the pilot to determine the altitude sector corresponding to the current location of the aircraft and compare the current altitude of the aircraft with the minimum altitude value for the altitude sector. As a result, the pilot can quickly and easily determine whether the current altitude of the aircraft is at or below the minimum altitude value for the altitude sector in which the aircraft is currently located, thereby increasing pilot situational awareness, the potential for obstacle and terrain avoidance, and flight safety. Unless otherwise specified, the term "minimum altitude value" or the like includes both minimum vectoring altitude (MVA) values and minimum safe altitude (MSA) values. Unless otherwise specified, the term "altitude sector" includes both vectoring altitude sectors and safe altitude sectors. The term "obstacle" as used herein refers to man-made and naturally-occurring structures such as towers, buildings, antennas, power lines, wind turbines, forest edges, and the like. The term "terrain" as used herein refers to land mass. The "responsible ATC facility" is the Air Traffic Control (ATC) facility from which the Air Traffic Controller (ATCO) is issuing vectoring instructions.

Figure 1:
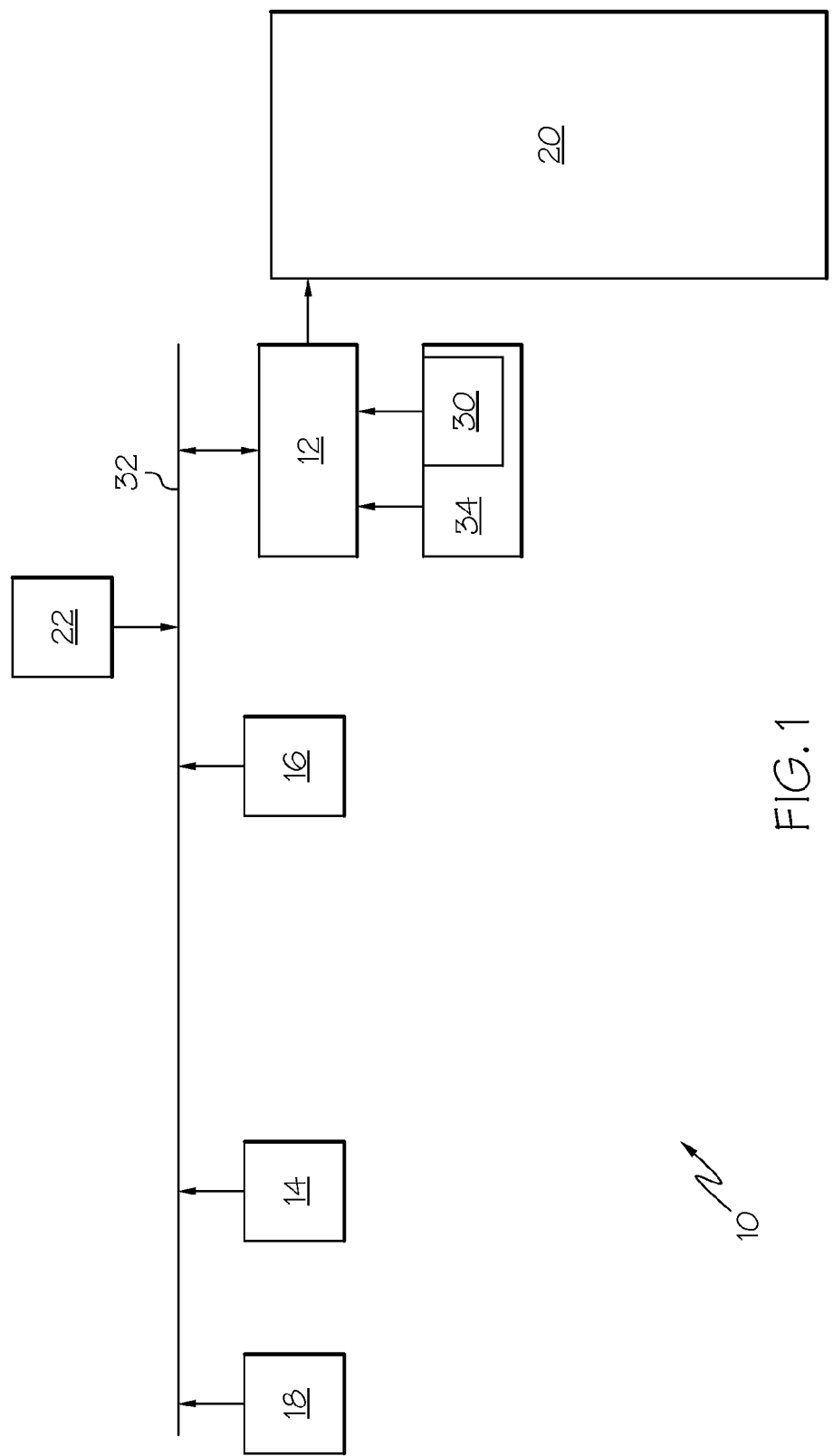
FIG. 1 is a simplified block diagram of a system for displaying integrated minimum safe altitude (MSA) and minimum vectoring altitude (MVA) information on a display device in an aircraft, according to exemplary embodiments of the present invention.

FIG. 1 is a simplified functional block diagram of a system 10 for displaying integrated minimum safe altitude (MSA) and minimum vectoring altitude (MVA) information on a display device in an aircraft, according to exemplary embodiments. System 10 includes multiple components each of which may be configured for use in an aircraft. In some embodiments, system 10 may be a self-contained system such that each of the components described below are contained in a single housing and are dedicated exclusively to serving the functions of system 10. In other embodiments, the various components described below may be standalone components or they may be components that are used as part of other systems and which are configured to be used as a shared resource between such other systems and system 10.

In the embodiment illustrated in FIG. 1, system 10 includes a display processor 12, a flight management system (FMS) 14, a position determining unit 16 (such as a Global Positioning System (GPS), inertial navigation system, or the like), avionics sensors 18, and a display device 20. The system may further include a user interface 22 for enabling interactivity with the system. The system may also include one or more databases 30 configured to support operation of the system, as hereinafter described. It should be understood that the one or more databases 30 include, but are not limited to, a navigational database, an avionics database, a terrain database, an obstacle database, and an instrument procedure database. The one or more databases may be contained in a data storage device 34. Although the system appears in FIG. 1 to be arranged as a single system on a data bus 32 (or avionics bus), other arrangements are possible as hereinafter described. It should be understood that FIG. 1 is a simplified representation of the system 10 for purposes of explanation and ease of description, and FIG. 1 is not intended to limit the application or scope of the subject matter in any way. In practice, while not illustrated, the system 10 and/or aircraft may either additional or fewer devices, components, and databases for providing system functions and features, as will be appreciated in the art. Data may be uploaded prior to flight or received from external sources, such as an airport transmitter or onboard sensors.

Display processor 12 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Display processor 12 may comprise a single processor or a plurality of processors acting in concert. In some embodiments, display processor 12 may be dedicated for use exclusively with system 10 while in other embodiments display processor may be shared with other systems onboard the aircraft. In still other embodiments, display processor may be integrated into any of the other components of system 10. For example, in some embodiments, display processor may be a component of the FMS 14.

Display processor 12 is coupled to the flight management system 14 and to the display device 20. Such communicative and operative connections may be effected through the use of any suitable means of transmission including both wired and wireless connections. For example, each component may be physically connected to display processor 12 via a coaxial cable or via any other type of wire connection effective to convey electronic signals. In other embodiments, as illustrated in FIG. 1, each component may be communicatively or operatively connected to display processor across the bus 32 or other similar communication corridor. Examples of suitable wireless connections include, but are not limited to, a Bluetooth connection, a Wi-Fi connection, an infrared connection or the like. Being communicatively and/or operatively coupled with FMS 14 and display device 20 provides display processor 12 with a pathway for the receipt and transmission of signals, commands, instructions, and interrogations to and from and each of the other components.

Display processor 12 may access or include the data storage device 34 containing the database 30. Data storage device including the database is coupled to display processor and may be a memory device (e.g., non-volatile memory, disk, drive, tape, optical storage device, mass storage device, avionics bus, etc.). As noted previously, the database 30 may include, for example, a terrain database, which includes the locations and elevations of natural and manmade terrain and obstacles along or at least proximate the flight path. The data may be used to compare aircraft position with various aspects of the flight plan and terrain environment to subsequently generate a synthetic view (a navigational map 36 (FIGS. 3 through 6) as hereinafter described) relative to the aircraft.

The database 30 also includes information obtained from governmental authorities such as the Federal Aviation Administration (FAA) or from the responsible ATC authority. In an exemplary embodiment, the database contains designated minimum safe altitude information for a plurality of known navigational reference points. The navigational reference points may comprise navigational aids, such as VHF omni-directional ranges (VORs), distance measuring equipment (DMEs), tactical air navigation aids (TACANs), and combinations thereof (e.g., VORTACs). As used herein, "navigational reference point" and variants thereof should also be understood as encompassing position fixes, such as initial approach fixes (IAFs), final approach fixes (FAFs) and other navigational reference points used in area navigation (RNAV). In an exemplary embodiment, the navigational reference points are located near a landing location (e.g., an airport), and each navigational reference point has one or more safe altitude sectors (FIGS. 3 through 6) proximate to the navigational reference point, each safe altitude sector having a designated minimum safe altitude level. In this regard, the landing location and/or navigational reference point may have one or more associated approaches, wherein the designated minimum safe altitude may be displayed on a published chart or approach plate for the navigational reference point. In an exemplary embodiment, for each navigational reference point, the database 30 maintains information regarding the geographic area (hereinafter a "first geographic area") corresponding to the one or more safe altitude sectors surrounding the navigational reference point, along with a designated MSA value for each safe altitude sector. For example, the database 30 may maintain, for each safe altitude sector, one or more bearings which define the angular boundaries of the safe altitude sector, a distance or radius which defines the radial extent of the safe altitude sector from the navigational reference point, and a designated minimum safe altitude for the safe altitude sector.

In an exemplary embodiment, the database 30 also contains designated minimum vectoring altitude for a geographic area (hereinafter the "second geographic area") centered around the Terminal Radar Approach Control (TRACON) antenna at the responsible ATC facility. The second geographic area is subdivided into vectoring altitude sectors (FIGS. 3 through 6) to gain relief from obstacles and terrain that are clear of the area in which vectoring is to be conducted. There is a designated MVA value for each vectoring altitude sector. The vectoring altitude sectors are large enough to accommodate the vectoring of aircraft within the altitude sector at the minimum vectoring altitude. For example, the database 30 may maintain, for each vectoring altitude sector, one or more bearings which define the angular boundaries of the vectoring altitude sector, a distance or radius which defines the radial extent of the vectoring altitude sector from the TRACON antenna, and a designated minimum vectoring altitude for the vectoring altitude sector. The designated minimum vectoring altitude for each vectoring altitude sector stored in the database may be obtained from governmental authorities such as the Federal Aviation Administration (FAA), the responsible ATC facility, or another source. In some cases, the first and second geographic areas may overlap in a common region as hereinafter described.

Generally, the display processor receives and/or retrieves positional, avionics, navigation, flight management, terrain, and MSA and MVA information (e.g., from the database 30). The display processor is configured to display, render, or otherwise convey, based on based on algorithms, software applications and/or subroutines, or other machine instructions stored in the display processor or in separate memory components, one or more graphical representations or images of information associated with operation of the aircraft on the display device, as hereinafter described. Such information may represent the information it receives and/or retrieves from database 30 such as inertial, avionics, navigation and flight management information as well as landing and/or terrain information such as heading indicators, tapes for airspeed and altitude, flight path information, required navigation performance (RNP) information, and any other information desired by a flight crew. In addition, in accordance with exemplary embodiments, the display processor is configured to generate images representing the MSA information (a "MSA image") and MVA information ("MVA image") that it retrieves and/or receives from database 30. In accordance with exemplary embodiments, the display processor is also configured to determine and indicate on the display device 20 the current location of the aircraft in an altitude sector to determine whether a current altitude of the aircraft (FIGS. 3 through 6) is above or below a designated MSA for a first geographic area proximate to an identified navigational reference point and above or below a designated MVA for a second geographic area centered around the Terminal Radar Approach Control (TRACON) antenna at the responsible ATC facility, as hereinafter described.

The flight management system 14 (or, alternatively, a flight management computer) is located onboard the aircraft and coupled to the display processor and display device. The flight management system may be coupled to one or more additional modules or components as necessary to support navigation, flight planning, and other aircraft control functions in a conventional manner. For example, the flight management system accesses the avionics bus 32 for obtaining real-time data and/or information regarding operation of the aircraft. The flight management system 14 is configured to obtain and/or determine the instantaneous altitude and position of the aircraft. In addition, the flight management system may include or otherwise access the terrain database. The navigational database may include navigational information that may be utilized by display processor to render a navigational map 36 on the display device 20, as described below.

The flight management system 14 is configured to obtain one or more navigational parameters associated with operation of the aircraft. The flight management system 14 may retrieve and/or receive navigational parameters from the illustrated position determining unit 16 (such as a global positioning system (GPS), inertial reference system (IRS), or a radio-based navigation system (e.g., VHF omni-directional radio range (VOR) or long range aid to navigation (LORAN)), and from one or more avionics sensors 18 suitably configured to support operation of the flight management system 14, as will be appreciated in the art. FMS 14 may also access or include the position determining unit 16 that is configured to determine the position of the aircraft with respect to the surface of the earth. FMS 14 may be configured to receive course, speed, and other avionic inputs relating to the aircraft heading, course, track, altitude, and attitude and generate a signal that may be utilized by processor to render images.

For example, avionics sensors 18 mounted to the aircraft are configured to detect gear and flap positions to provide flight status information (e.g., wheels are down for landing). In this regard, the flight management system may communicate with one or more navigational aids, as will be understood. In an exemplary embodiment, the flight management system 14 is capable of obtaining and/or determining the current location of the aircraft (e.g., the latitude and longitude) and the heading of the aircraft (i.e., the direction the aircraft is traveling in relative to some reference) and providing these navigational parameters to the flight management system 14. The navigation data provided to the flight management system may also include information about the aircraft's airspeed, altitude, pitch, flight path, intended destination, takeoff and landing information, and other important flight information. In exemplary embodiments, the flight management system 14 may include any suitable position and direction determination devices that are capable of providing the display processor 12 with at least an aircraft's current position, the real-time direction of the aircraft in its flight path, the waypoints along the flight path, the weather along the flight path, and other important flight information (e.g., elevation, pitch, airspeed, altitude, attitude, etc.). As noted previously, the flight management system 14 is communicatively coupled to the display processor 12 and may provide navigation data associated with the aircraft's current position and flight direction (e.g., heading, course, track, etc.) to the display processor 12. Using data retrieved (or received) from the flight management system 14 or from any of the databases, the display processor 12 executes one or more algorithms (e.g., implemented in software) for generating text, images, etc. on the display device 20, as hereinafter described.

System 10 also includes the display device 20 operatively coupled to the display processor 12. In an exemplary embodiment, the display device 20 is realized as an electronic display configured to graphically display flight information or other data associated with operation of the aircraft under control of the flight management system 14, as will be understood. The display device 20 is located within a cockpit of the aircraft. In accordance with an exemplary embodiment, the display may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (Thin Film Transistor) displays. The display device may additionally be implemented as a panel mounted display, a HUD (Head-Up Display) Projection, or any one of numerous known technologies. It is additionally noted that the display device may be configured as any one of numerous types of aircraft flight deck displays. For example, it may be configured as a multi-function display, a horizontal situation indicator, or a vertical situation indicator. In the depicted embodiment, however, the display device is configured as a primary flight display (PFD) for an aircraft. In some embodiments, system 10 may include multiple display devices 20.

The user interface 22 is coupled to the system and may also be located within the cockpit of the aircraft and adapted to allow a user (e.g., pilot, co-pilot, or crew member) (also known as an "operator") to interact with the system 10, as described in greater detail below. In various embodiments, the user interface may be realized as a keypad, touchpad, keyboard, mouse, touchscreen, joystick, or another suitable device adapted to receive input from a user. In an exemplary embodiment, the user interface and flight management system are cooperatively configured to enable a user to indicate and/or select a desired navigational reference point, as hereinafter described. In another exemplary embodiment, the user interface and flight management system are cooperatively configured to enable a user to select whether to display the MVA image. For example, the user may be issued vectoring instructions to descend below the MSA for the altitude sector in which the aircraft is located. Using the user interface, the user may display the MVA image to determine the minimum vectoring altitude value for the altitude sector in which the aircraft is located. In other embodiments, the system may automatically display the MVA image. The user interface 22, display device 20, and display processor 12 may otherwise cooperate to enable the user to, among other things, select or otherwise interact with other items or elements on the display device 20. Such items or elements may include selectable labels, selectable flight levels or altitudes, text boxes, and pop-up menus, boxes, and notifications.

Figure 2:
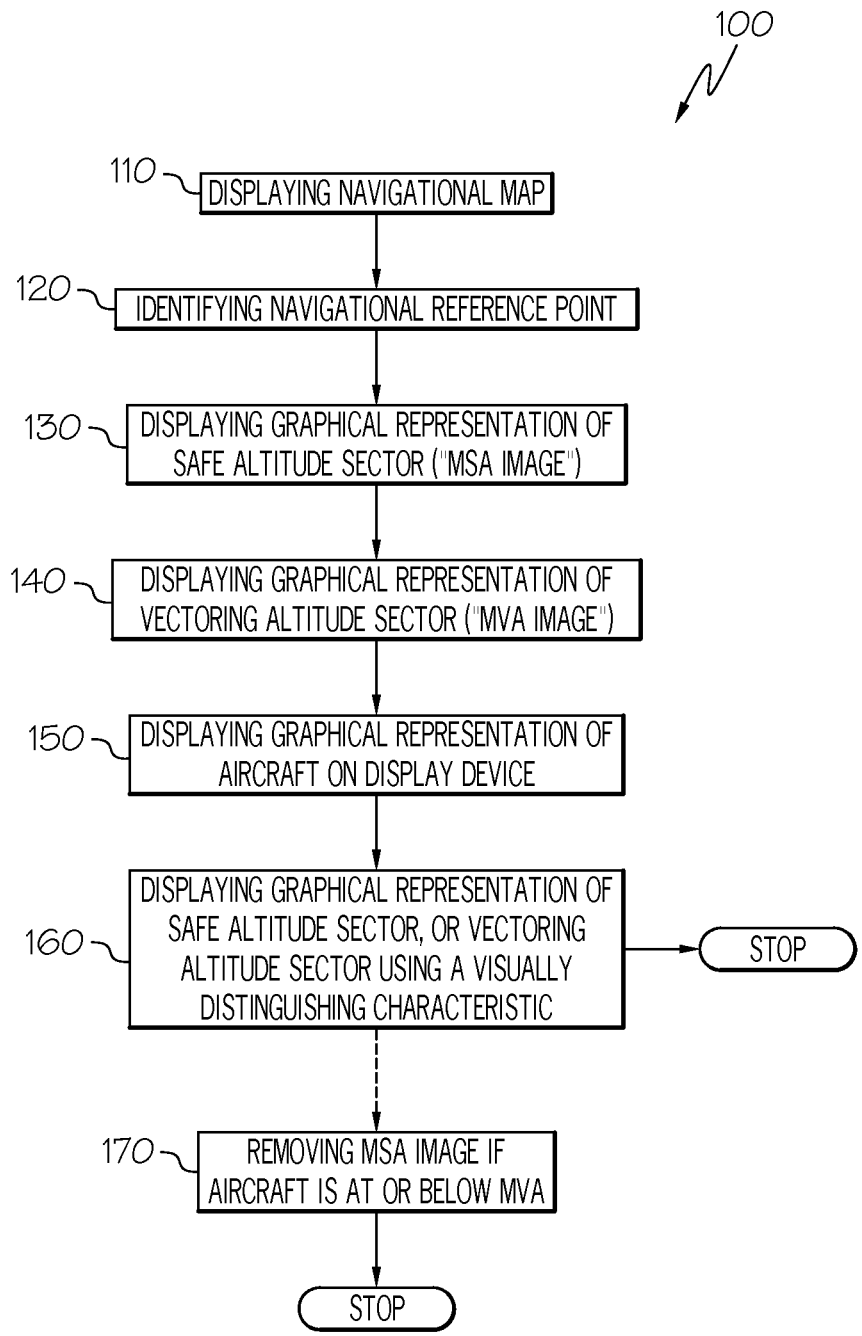
FIG. 2 is a flow diagram of a method for displaying integrated minimum safe and vectoring altitude information on a display device in an aircraft, according to another exemplary embodiment of the present invention.

Referring now to FIG. 2, in an exemplary embodiment, the system 10 may be configured to perform a method 100 for displaying integrated minimum safe altitude and minimum vectoring information on a display device in an aircraft. The method 100 (FIG. 2) may be performed to indicate whether the aircraft is below the minimum altitude value for the altitude sector in which the aircraft is currently located or at risk of descending below the minimum altitude value for the altitude sector to which the aircraft is heading.

FIGS. 3 through 6 illustrate representative images generated on the display device 20 by the display processor 12 of system 10 of FIG. 1 in accordance with exemplary embodiments. The representative images of FIGS. 3 through 6 follow an aircraft as it descends from above a minimum safe altitude to below a minimum vectoring altitude, as hereinafter described. Still referring to FIG. 2, method 100 for displaying integrated minimum safe altitude and minimum vectoring information on a display device in an aircraft begins by displaying a navigational map (step 110). The display processor 12 is configured to control the rendering of the navigational map 36 graphically displayed on the display device 20. The navigational map 36 may be overlaid or rendered on top of a background 38. The background 38 may be a graphical representation of the terrain, topology, or other suitable items or points of interest along or at least proximate a flight path of own aircraft which may be maintained in the terrain database.

Although FIGS. 3 through 6 depict a top view (e.g., from above own aircraft 40) of the navigational map 36, in practice, alternative embodiments may utilize various perspective views, such as side views, three-dimensional views as hereinafter described (e.g., a three-dimensional synthetic vision display), angular or skewed views, and the like. While FIGS. 3 through 6 depict the aircraft 40 (own aircraft) as traveling across the map 36, as opposed to being located at a fixed position on the map 36, FIGS. 3 through 6 do not limit the scope of the subject matter in any way. The navigational map 36 is associated with the movement of the aircraft 40, and the background 38 refreshes or updates as the aircraft travels, such that the graphical representation of the aircraft 40 as hereinafter described is positioned over the background 38 in a manner that accurately reflects the instantaneous (or substantially real-time) real-world positioning of the aircraft 40 relative to the earth. Although the navigational map 36 shown in FIGS. 3 through 6 is oriented north-up (i.e., moving upward on the map 36 corresponds to traveling northward), as described below, in other embodiments, the navigational map 36 may be oriented track-up or heading-up, i.e., aligned such that the aircraft 40 is always traveling in an upward direction and the background 38 adjusted accordingly.

Method 100 continues by identifying a navigational reference point (step 120). In accordance with one embodiment, the navigational reference point may be identified by a user (e.g., a pilot or air traffic controller). For example, the pilot may designate or select a destination airport and/or landing location via user interface 22. In an exemplary embodiment, the airport and/or landing location has a designated IFR approach procedure which includes a Minimum Altitude sector Altitude (MSA) or Terminal Arrival Area (TAA). In response to the user input, the flight management system may identify a navigational reference point associated with the identified airport and/or landing location, which is used to define one or more safe altitude sectors proximate the airport and/or landing location. Alternatively, the flight management system may automatically identify a navigational reference point. For example, the flight management system may identify the navigational reference point based on an airport and/or landing location previously entered into a flight plan. Alternatively, the flight management system may access the first navigational database and determine the navigational reference point that is nearest the current location of the aircraft. The navigational reference point is represented in the illustrated embodiments of FIGS. 3 through 6 as navigational reference point 41.

Still referring to FIG. 2 and to FIGS. 3 through 6, method for displaying integrated minimum safe altitude and minimum vectoring altitude information on a display device in an aircraft continues by displaying a graphical representation of one or more safe altitude sectors 42, 44, 46 associated with the identified navigational reference point 41 on the display device (step 130). The graphical representation of the one or more safe altitude sectors may be referred to herein as an "MSA image" (identified in FIGS. 3 through 6 as MSA image 50). In accordance with an embodiment, the display processor 12 displays the one or more safe altitude sectors (e.g., 42, 44, 46) in response to determining the distance between the aircraft 40 and the navigational reference point 41 is less than a threshold distance. For example, many MSAs or TAAs extend radially outward from a respective navigational reference point for some distance, generally ranging from approximately twenty to thirty nautical miles. The display processor 12 may determine when the aircraft 40 is within thirty nautical miles of the navigational reference point, and in response display the one or more safe altitude sectors (e.g., 42, 44, 46) on the display device. While three safe altitude sectors are depicted in FIGS. 3 through 6, it is to be understood that the MSA image may include fewer or a greater number of safe altitude sectors. The number of safe altitude sectors is determined based on the terrain and obstacles within the first geographic area. Each geographic area will be different based on its own unique terrain and obstacles features.

After identifying the navigational reference point, the display processor obtains the relevant bearing information from database 30 for the safe altitude sectors 42, 44, 46 associated with the navigational reference point 41. The safe altitude sectors 42, 44, 46 correspond to geographic areas ("a first geographic area") proximate the navigational reference point 41, each safe altitude sector 42, 44, 46 having a respective minimum safe altitude value as hereinafter described. The minimum safe altitude value may be determined based on the real-world terrain and/or obstacles within the first geographic area defined by the altitude sectors 42, 44, 46 and may be prescribed, for example, by regulations set forth by a governmental and/or regulatory body or airline company/operator. In the exemplary embodiment shown in FIGS. 3 through 6, the safe altitude sectors 42, 44, 46 comprise the MSA image 50 for navigational reference point 41. Safe altitude sector 42 has bearing endpoints of 180° and 280° (measured relative to south, i.e., due south is 0°), with a minimum safe altitude value of 5500 feet and a radius of a selected number of nautical miles from the navigational reference point 41. Safe altitude sector 44 has bearing endpoints of 70° and 280°, with a minimum safe altitude value of 4500 feet and a radius of a selected number of nautical miles from the navigational reference point 41. Safe altitude sector 46 has bearing endpoints of 70° and 180°, with a minimum safe altitude value of 3000 feet and a radius of a selected number of nautical miles from the navigational reference point 41. As shown in FIGS. 3 through 6, the safe altitude sectors 42, 44, 46 are aligned with the navigational reference point 41 in a manner that corresponds to the real-world location of the respective geographic areas proximate to navigational reference point.

Figure 3:
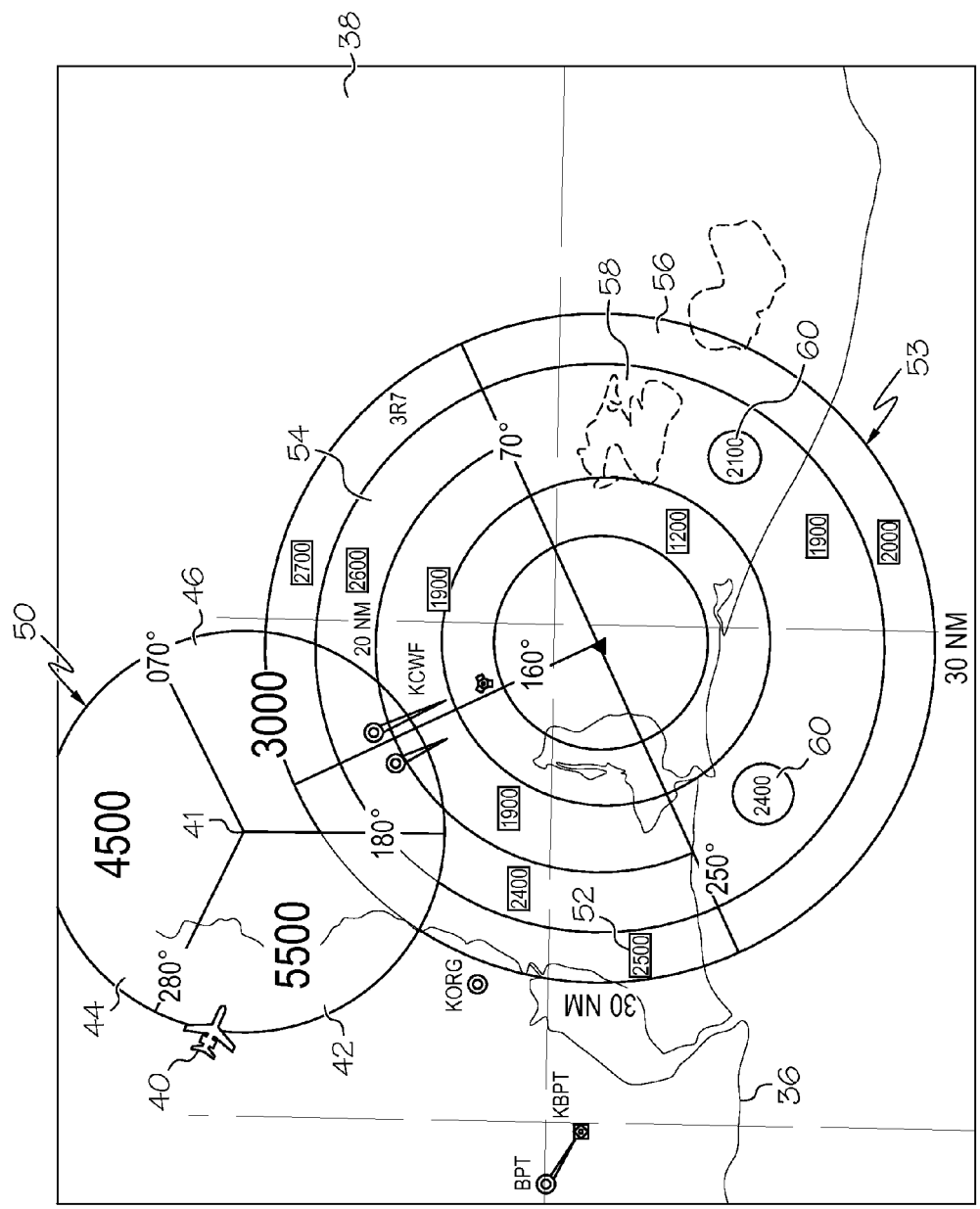
FIGS. 3 through 6 are representative two-dimensional images of integrated MSA and MVA information in a north-up mode, the two-dimensional images generated by the system of FIG. 1, according to exemplary embodiments.

Referring again to FIG. 2 and still referring to FIGS. 3 through 6, method for displaying integrated minimum safe altitude and minimum vectoring information on a display device in an aircraft continues by displaying a graphical representation of one or more vectoring altitude sectors on the display device (also referred to herein as an "MVA image 53") (step 140). The graphical representation of the one or more vectoring altitude sectors (e.g., vectoring altitude sectors 52, 54, 56, 58) is generated based on the MVA information accessed from the database 30, and travel conditions provided by the FMS 14. For ease of illustration, only vectoring altitude sectors 52, 54, 56, and 58 of a plurality of vectoring altitude sectors are identified in FIGS. 3 through 6. The display processor generates the MVA image 53 for display by the display device 20. The MVA image may also display obstacle buffer areas 60, each buffer area having a MVA as illustrated in FIG. 3, for example. The display processor sends a command to display the one or more vectoring altitude sectors in response to determining that the aircraft is within the maximum displayable range of the ATC radar system as determined by a radial distance between the aircraft and the TRACON antenna at the responsible ATC facility (measured, for example, in nautical miles). For example, the display processor may determine when the aircraft is within the maximum displayable range of the TRACON antenna, and in response display the one or more vectoring altitude sectors on the display device. Alternatively, the one or more vectoring altitude sectors may be generated via user interface 22, such as if needed to independently verify that the altitude clearance provided in a vectoring instruction is not below the MVA for the vectoring altitude sector in which the aircraft is currently located.

The display processor also obtains from database 30 the relevant bearing information for the vectoring altitude sectors 52, 54, 56, 58 associated with the TRACON antenna. The vectoring altitude sectors 52, 54, 56, 58 correspond to the geographic areas surrounding the TRACON antenna at the responsible ATC facility (i.e., the second geographic area). Each vectoring altitude sector 52, 54, 56, 58 has a respective minimum vectoring altitude value. The minimum vectoring altitude value may be determined based on the real-world terrain and/or obstacles within the second geographic area defined by the vectoring altitude sectors 52, 54, 56, 58 and may be prescribed, for example, by the responsible ATC facility based on regulations set forth by a governmental and/or regulatory body. In the exemplary embodiment shown in FIGS. 3 through 6, vectoring altitude sector 52 has bearing endpoints of 160° and 250° (measured relative to north, i.e., due north is 0°), with a minimum vectoring altitude value of 2500 feet and a radius of 25-30 nautical miles (nm) from the TRACON antenna. Vectoring altitude sector 54 has bearing endpoints of 70° and 160° with a minimum vectoring altitude value of 2600 feet and a radius of 20-25 nautical miles from the TRACON antenna. Vectoring altitude sector 56 has bearing endpoints of 250° and 70°, with a minimum vectoring altitude value of 2000 feet and a radius of 25 to 30 nautical miles from the TRACON antenna. Vectoring altitude sector 58 has bearing endpoints of 250° and 70°, with a minimum vectoring altitude value of 1900 feet and a radius of 25 to 30 nautical miles from the TRACON antenna.

The MSA and MVA images are displayed overlying the terrain background of the navigational map 36. In the illustrated embodiments of FIGS. 3 through 6, the safe altitude sectors (the MSA image) and the vectoring altitude sectors (the MVA image) have the same orientation as the navigational map. For example, the navigational map and altitude sectors 42, 44, 46 and 52, 54, 56, 58 are both oriented north-up. In north-up mode, the altitude sectors 42, 44, 46 and 52, 54, 56, 58 are oriented such that the upward direction corresponds to North or 180°. In other embodiments, the navigational map and altitude sectors may be oriented track-up (FIG. 7) or in some other manner that is influenced by the heading of the aircraft, as hereinafter described. A portion of the graphical representation of the one or more safe altitude sectors (the MSA image 50) may overlap a portion of the graphical representation of the one or more vectoring altitude sectors (the MVA image 53), as depicted in FIGS. 3 through 6. As noted previously, the first and second geographic areas may share a common geographic region. The overlapping portions of the graphical representations (i.e., the MSA and MVA images) correspond to the common geographic region. It is to be understood that if there is no shared common geographic region between the first and second geographic areas, the images may not overlap.

Text conveying the respective minimum safe altitude for the altitude sectors 42, 44, 46 is displayed within the altitude sectors 42, 44, 46 in FIG. 3. Text conveying the respective minimum vectoring altitude for at least one of the displayed vectoring altitude sectors 52, 54, 56, 58 is likewise displayed within at least one vectoring altitude sector. As with the minimum safe altitude sectors, the number of vectoring altitude sectors is determined by the features present in the second geographic area. In alternative embodiments, the respective minimum safe altitude values may be displayed outside the safe altitude sectors 42, 44, 46 and/or the respective minimum vectoring altitudes may be displayed outside of the vectoring altitude sectors 52, 54, 56, 58. The display may include labels (not shown) within or proximate the MSA and MVA images identifying each respectively as an "MSA" image or a "MVA" image. The labels identifying the MSA and MVA images as such may be transparent so that the various underlying data or images may be seen. The labels may also be omitted entirely.

Still referring to FIG. 2 and to FIGS. 3 through 6, method 100 continues by displaying a graphical representation of the aircraft 40 on the display device within the altitude sector correlating to the current location of the aircraft (if the current location of the aircraft is within a geographic area defined by an altitude sector) (step 150). The graphical representation of the aircraft is oriented in a manner that reflects the current heading of the aircraft relative to North and is displayed within an safe altitude sector at a location that correlates with the real-world location of the aircraft 40 relative to the navigational reference point 41 or within a vectoring altitude sector at a location that correlates with the real-world location of the aircraft 40 relative to the TRACON antenna at the responsible ATC facility. The aircraft 40 is displayed and/or positioned such that it reflects the instantaneous altitude and position of the aircraft. The pilot is able to quickly determine the current location of the aircraft in an altitude sector and compare the current altitude of the aircraft to the minimum altitude value for the altitude sector in which the aircraft is currently located. For example, the pilot may identify the current location of the aircraft 40 as being within safe altitude sector 42 with a designated minimum safe altitude value of 5500 feet (FIGS. 3 and 4), within safe altitude sector 46 with a designated minimum safe altitude value of 3000 feet (FIG. 5), or within vectoring altitude sector 54 with a designated minimum vectoring altitude value of 2600 feet. If the current altitude of the aircraft is above the minimum altitude value for the altitude sector in which the aircraft is currently located, no action needs to be taken by the pilot. If the pilot is issued vectoring instructions to descend, the pilot may verify the minimum vectoring altitude value in the vectoring altitude sector (which may overlap with the safe altitude sector) in which the aircraft is currently located and in the vectoring altitude sector for which the aircraft is heading.

Method 100 for displaying integrated minimum safe altitude and minimum vectoring altitude information further comprises optionally displaying the graphical representation of the altitude sector using a visually distinguishing characteristic to indicate that the aircraft is at or below the designated minimum altitude value for the altitude sector in which the aircraft is currently located, or is at risk of descending below the designated minimum altitude value (step 160). The risk is determined by the aircraft trajectory, time, etc., i.e., the descent velocity of the aircraft may indicate that the aircraft will descend below a minimum altitude value based upon a time-based prediction of the flight path vector (e.g., a 30 second prediction of the flight path trajectory). The display of the altitude sector using a visually distinguishable characteristic may be based on aircraft trajectory and time. Using the avionics sensors, through the flight management system and other methods, aircraft trajectory can be predicted and compared against the minimum altitude sectors in the MSA and MVA images. The altitude sectors may have an initial or default display state if the aircraft is above the designated minimum altitude value for the altitude sector in which the aircraft is currently located (e.g., no visual effects, no obviously distinguishable visible characteristics, or the like) to indicate the aircraft is neither below nor at risk of descending below the minimum altitude value. For example, referring again to FIG. 3, if the current location of the aircraft is in safe altitude sector 42 (with a designated minimum safe altitude value of 5500 feet) at a current altitude above 5500 feet, safe altitude sector 42 may be in a default state as depicted.

Figure 4:
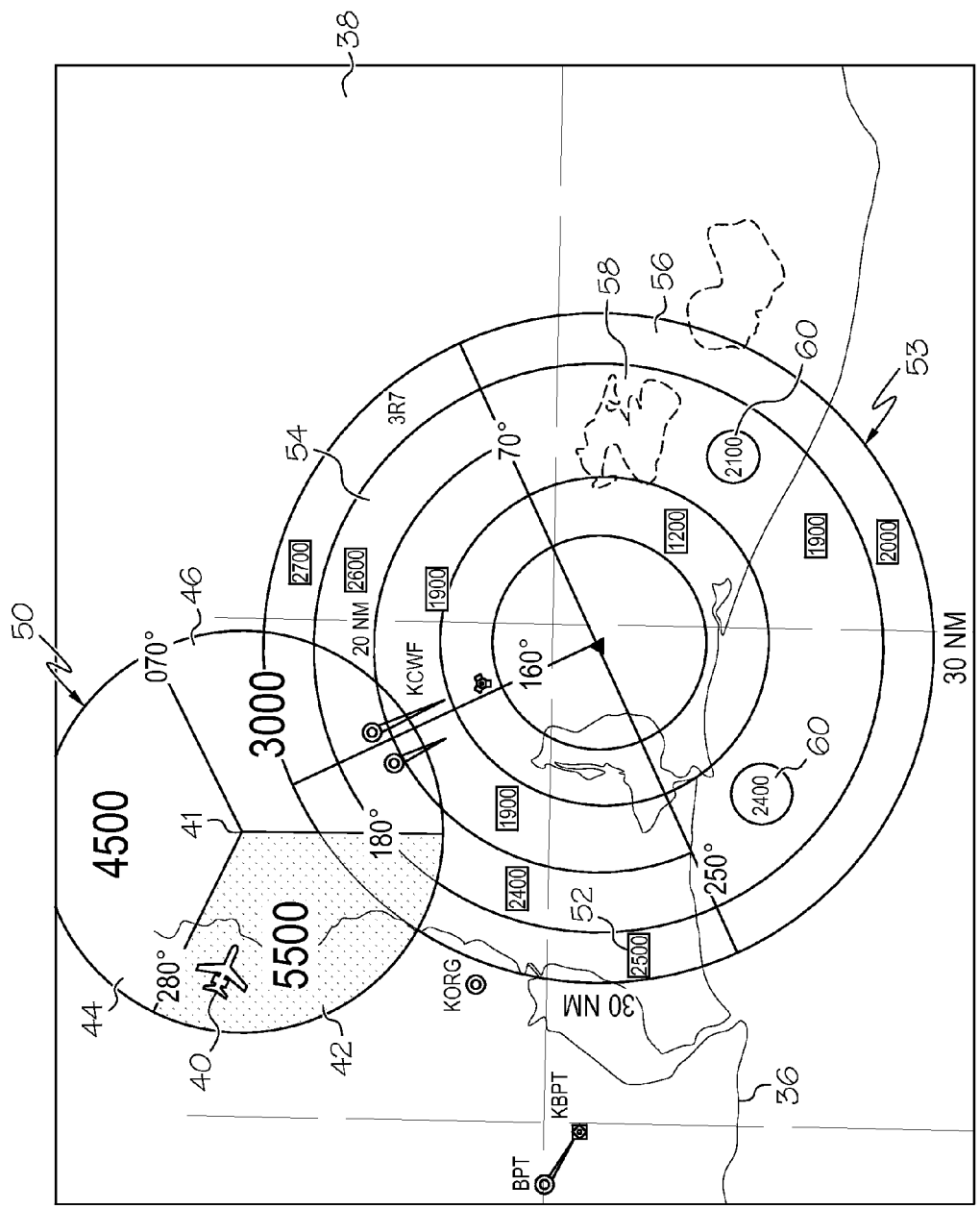

Referring now specifically to FIG. 4, the display processor 12 displays safe altitude sector 42 using a first visually distinguishing characteristic to indicate that the aircraft is at risk of descending below the designated minimum safe altitude level for the safe altitude sector in which the aircraft is currently located. If the aircraft remains in safe altitude sector 42 and is at risk of descending below 5500 feet, safe altitude sector 42 may be displayed by shading and/or filling the interior of the safe altitude sector 42 using amber, yellow, or another color designed to warn the pilot that the aircraft is at risk of descending below the designated minimum safe altitude for the current safe altitude sector 42. In other embodiments, the interior of the altitude sector 42 may be displayed with another visually distinguishable characteristic (e.g., brightness, contrast, tint, transparency, opacity) relative to the remaining images displayed on the navigational map 36. Similarly, the interior of the altitude sector 42 may be highlighted by using a distinguishable animation or other graphical effects to alert the user of noncompliance with the minimum altitude level. Alternatively, the visually distinguishable characteristic may be applied to the outline of the identified altitude sector, text associated with the identified altitude sector, or the image of the aircraft 40. The visually distinguishable characteristic may be realized by using one or more of the following: color, hue, tint, brightness, graphically depicted texture or pattern, contrast, transparency, opacity, animation (e.g., strobing, flickering or flashing), and/or other graphical effects. In an exemplary embodiment, the visually distinguishable characteristic is used to highlight or focus the user's attention on the identified altitude sector relative to other altitude sectors. It should be understood that the visually distinguishing characteristics described above are exemplary and do not comprise an exhaustive list of techniques that may be employed to visually distinguish an altitude sector.

Figure 5:
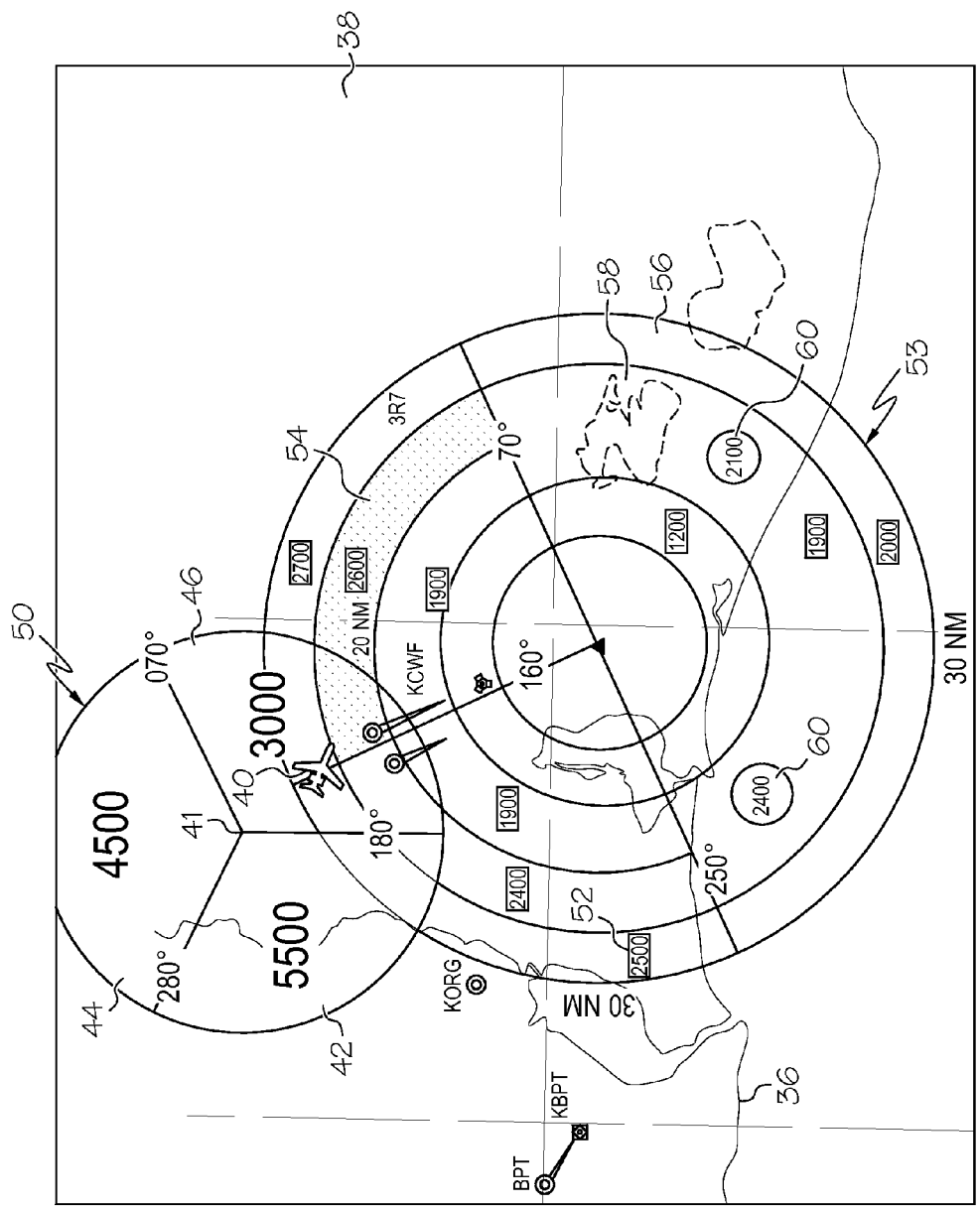

Referring now specifically to FIG. 5, the display processor 12 displays the vectoring altitude sector (e.g., vectoring altitude sector 54) to which the aircraft 40 is heading using a second visually distinguishing characteristic to indicate that the aircraft is at risk of descending below the designated minimum vectoring altitude level for the vectoring altitude sector to which the aircraft is headed. For example, if the aircraft 40 travels from safe altitude sector 42 to the overlapping region of safe altitude sector 46 (having a designated minimum safe altitude value of 3000 feet) and vectoring altitude sector 54 (having a designated minimum vectoring altitude of 2600 feet) and the aircraft is traveling at 2800 feet, the display processor may display vectoring altitude sector 54 using the second visually distinguishing characteristic indicating that the aircraft has descended below the MSA and is at risk of descending below the minimum vectoring altitude value of the vectoring altitude sector to which the aircraft is heading. The second visually distinguishing characteristic may be the same as or different from the first visually distinguishing characteristic. In the embodiment illustrated in FIG. 5, vectoring altitude sector 54 is displayed using the second visually distinguishing characteristic to indicate the aircraft is below the minimum safe altitude for safe altitude sector 46 and is at risk of descending below the minimum vectoring altitude for vectoring altitude sector 54.

Figure 6:
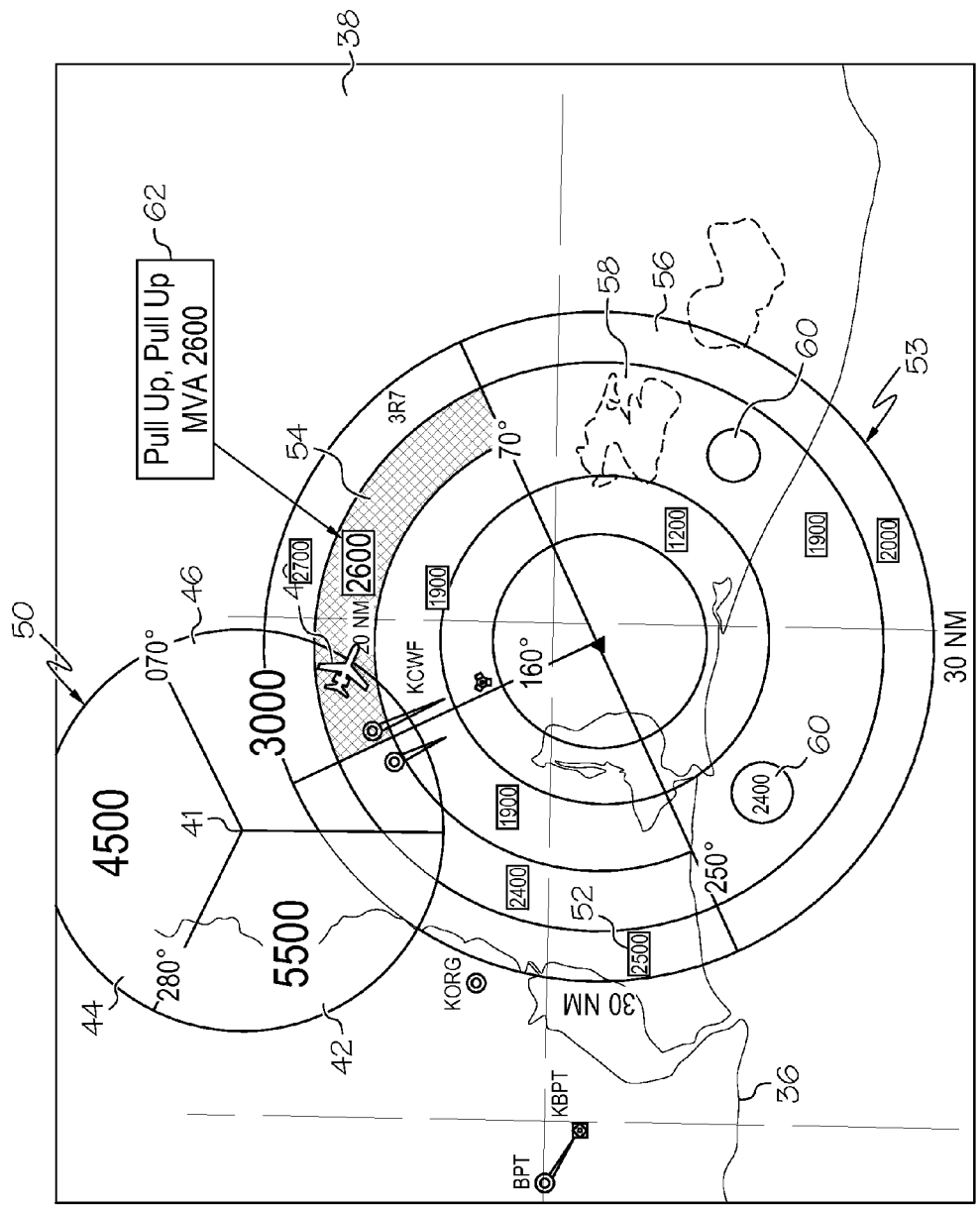

Referring now to FIG. 6, the display processor 12 displays vectoring altitude sector 54 using a third visually distinguishing characteristic to indicate that the aircraft is below the designated minimum vectoring altitude level for the vectoring altitude sector 54 in which the aircraft 40 is currently located. For example, if the aircraft is traveling at 2600 feet over vectoring altitude 54, vectoring altitude sector 54 may be displayed with a third visually distinguishing characteristic (e.g., displayed in red or another color) designed to indicate the aircraft is at or below the designated minimum vectoring altitude for the vectoring altitude sector in which the aircraft is currently located. The third visually distinguishing characteristic may be the same as or different from the first visually distinguishing characteristic, the second visually distinguishing characteristic, or both of the first and second visually distinguishing characteristics. As noted previously, the visually distinguishable characteristic (the first, the second, and the third) may be realized by using one or more of the following: color, hue, tint, brightness, graphically depicted texture or pattern, contrast, transparency, opacity, animation (e.g., strobing, flickering or flashing), and/or other graphical effects. In some embodiments, the display processor 12 may provide an audible warning to inform the operator that the aircraft is below the designated minimum vectoring altitude for the vectoring altitude sector. In some embodiments, the display processor may generate a textual alert 62 on the display device 20 to inform the operator that the aircraft is below the designated minimum vectoring altitude for the vectoring altitude sector in which the aircraft is currently located. If the MVAs are sufficiently high to minimize activation of aircraft ground proximity warning systems (GPWS/TAWS), the display of the vectoring altitude sector using visually distinguishing characteristics and/or the generation of alerts provide additional aircraft climbing time relative to a GPWS/TAWS warning, thereby increasing the potential for obstacle and terrain avoidance.

In an embodiment, method 100 further comprises the step of removing the MSA image from the display if the aircraft is at or below the designated minimum vectoring altitude level for the vectoring altitude sector in which the aircraft is currently located (step 170). Removal of the MSA image declutters the display screen and focuses the pilot's attention on the fact that the aircraft is at or below the designated minimum vectoring altitude level. Step 170 is optional. Removal may be automatic through system 10 or via user interface 22.

It should be appreciated that the graphical representations as depicted in FIGS. 3 through 6 (and FIG. 7) represent the state of a dynamic display frozen at one particular time, and that the display device may be continuously refreshed during operation of the aircraft to reflect changes in the altitude and/or position of the aircraft. In an exemplary embodiment, the loop defined by steps 130, 140, 150, and 160 repeats as desired during operation of the aircraft. For example, the display may continually refresh as long as the aircraft is within a threshold distance of the navigational reference point/TRACON antenna at the responsible ATC facility. In this manner, if the aircraft travels from a geographic area corresponding to a first safe altitude sector (e.g., safe altitude sector 42 in FIGS. 3 through 6) to a geographic area corresponding to a second safe altitude sector (e.g., safe altitude sector 44 in FIGS. 3 through 6), the display processor may identify the second safe altitude sector as the appropriate safe altitude sector for analysis. For example, referring again to FIG. 3, if the aircraft travels from safe altitude sector 42 to safe altitude sector 44, the navigational map 36 may be refreshed or updated to show the aircraft 40 within safe altitude sector 44. Safe altitude sector 42 may be restored to the initial or default state (as shown in FIG. 3, no coloring or highlighting), while safe altitude sector 44 is displayed in a manner that is influenced by the altitude of the aircraft (step 160). Similarly, if the aircraft travels from a geographic area corresponding to a first vectoring altitude sector (e.g., vectoring altitude sector 54 in FIGS. 3 through 6) to a geographic area corresponding to a second vectoring altitude sector (e.g., vectoring altitude sector 56 in FIGS. 3 through 6), the display processor 12 may identify the second vectoring altitude sector 56 as the appropriate vectoring altitude sector for analysis. For example, referring again to FIG. 3, if the aircraft travels from vectoring altitude sector 52 to vectoring altitude sector 54, the navigational map may be refreshed or updated to show the aircraft 40 within vectoring altitude sector 54. Vectoring altitude sector 52 may be restored to the initial or default state (as shown in FIG. 3, no coloring or highlighting), while vectoring altitude sector 54 is displayed in a manner that is influenced by the altitude of the aircraft (step 160).

Figure 7:
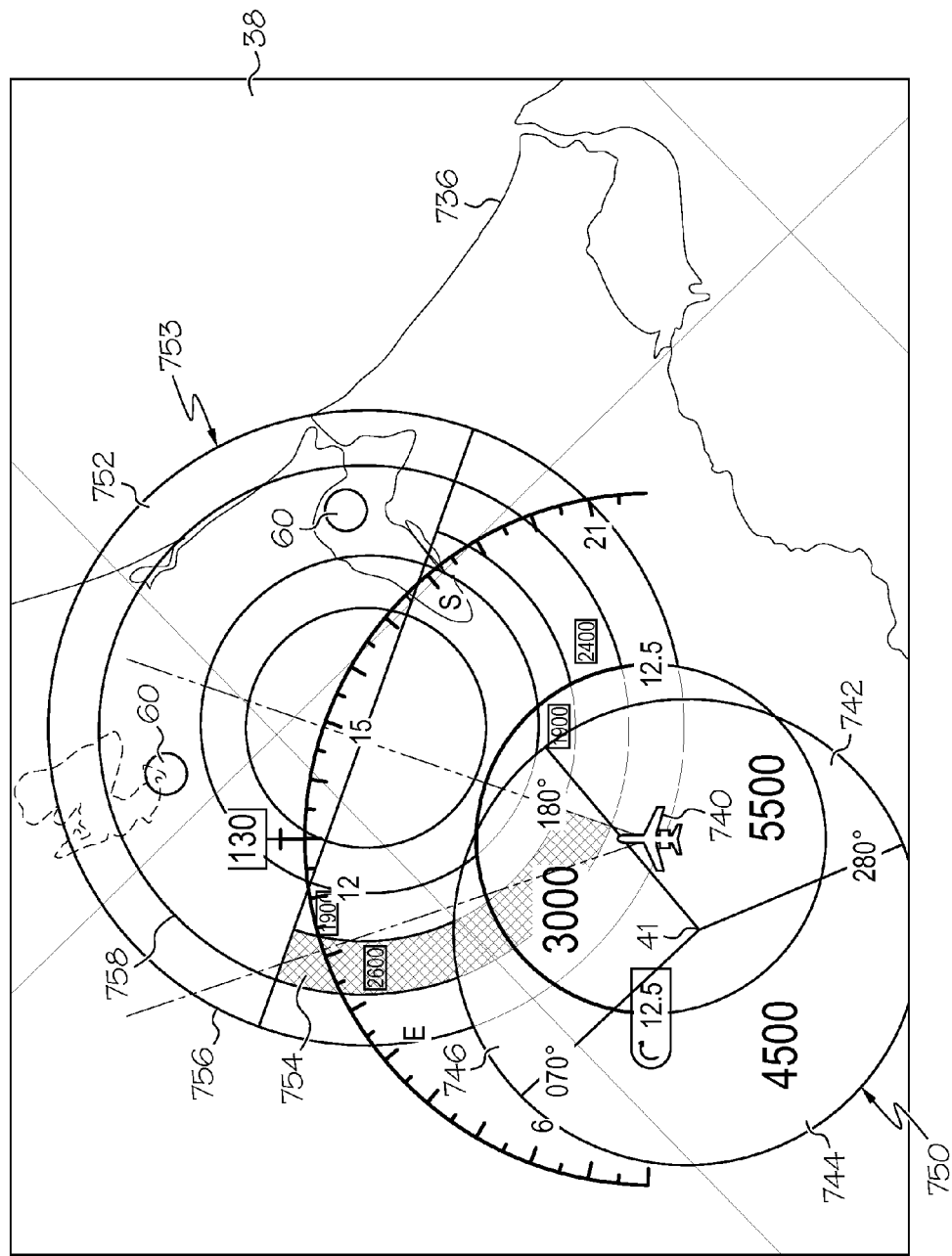
FIG. 7 is a representative two-dimensional image of integrated MSA and MVA information in a track-up mode, the two-dimensional image generated by the system of FIG. 1.

While FIGS. 3 through 6 depict the navigational map 36 in a north-up mode, the navigational map may be depicted in a track-up mode as shown in FIG. 7. As shown in FIG. 7, in track-up mode (or heading-up mode), the safe altitude sectors 742, 744, 746 (of MSA image 750) and vectoring altitude sectors 752, 754, 756, 758 (of MVA image 753) are rotated such that they are aligned with the instantaneous heading of the aircraft. For this particular embodiment, the aircraft 740 is fixedly displayed as traveling in the upward direction. For example, if the heading of the aircraft is due south, the display processor may rotate the safe altitude sectors 742, 744, 746 and the vectoring altitude sectors 752, 754, 756, 758, for example, by adjusting the bearing endpoints by 180°. In this regard, when navigational map 736 is refreshed, display processor may monitor the heading of the aircraft and adjust or reposition the safe altitude sectors 742, 744, 746 and the vectoring altitude sectors 752, 754, 756, 758 such they accurately reflect the instantaneous heading and position of the aircraft.

Figure 8:
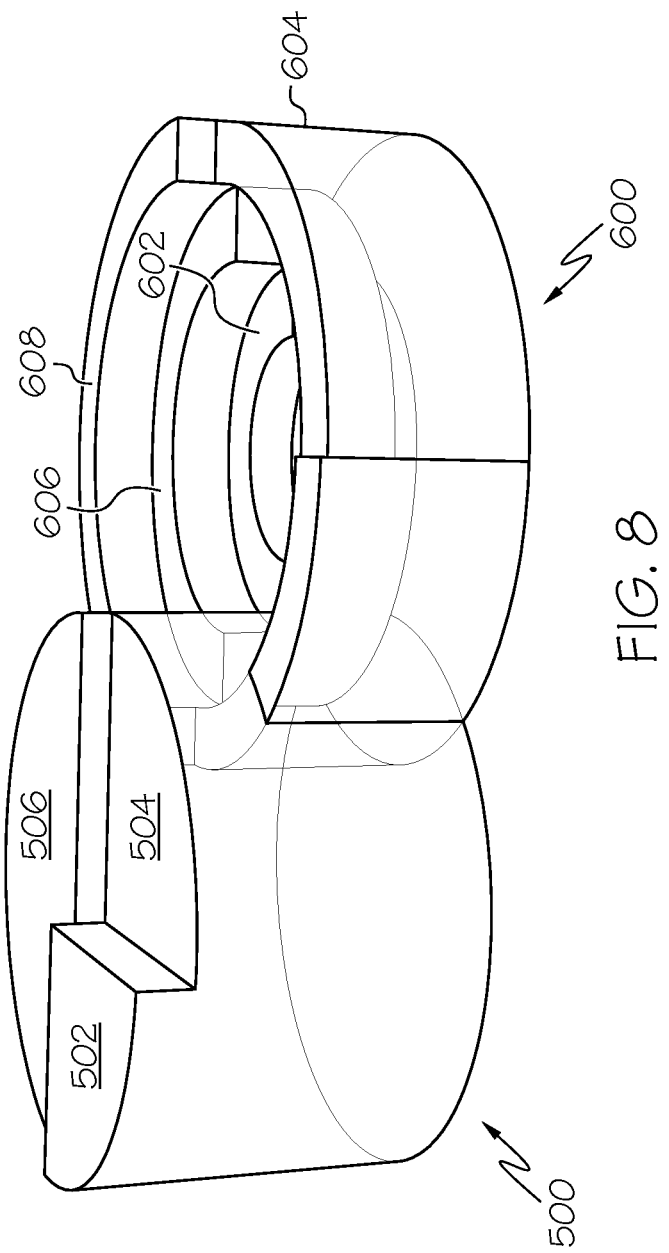
FIG. 8 is an exocentric view of representative three-dimensional images of integrated MSA and MVA information, the three-dimensional images generated by the system of FIG. 1, according to another exemplary embodiment of the present invention.

While FIGS. 3 through 7 illustrate two-dimensional graphical representations of MSA and MVA information, it is to be understood that the system 10 may generate three-dimensional graphical representations of the MSA and MVA information such as shown in the exocentric view of integrated display of FIG. 8. The three-dimensional MSA image is identified with reference numeral 500 and the three-dimensional MVA image is identified with reference numeral 600. The altitude sectors in the three-dimensional graphical representations are represented as altitude tiers, with each altitude tier having a designated minimum altitude value (the designated minimum altitude values are not shown in FIG. 8 for ease of illustration). The relationship between the minimum altitude values is indicated by the height of the respective altitude tier. For example, in the illustrated embodiment of FIG. 8, MSA image 500 is generated with three safe altitude tiers 502, 504, 506. Safe altitude tier 502 has the highest minimum safe altitude value relative to safe altitude tiers 504 and 506. Safe altitude tier 504 has the lowest safe altitude value with safe altitude tier 506 having a minimum safe altitude value (not shown) intermediate that of safe altitude tiers 502 and 504. A portion of the three-dimensional MSA image overlaps a portion of the three-dimensional MVA image 600, the overlapping portions corresponding to a common geographic region shared by the first geographic area (MSA image) and the second geographic area (MVA image). The MVA image 600 in FIG. 8 comprises four vectoring altitude tiers 602, 604, 606, 608, with each vectoring altitude tier having a designated vectoring altitude value (not shown in FIG. 8). The number of altitude tiers in each three-dimensional image corresponds to the number of altitude sectors in each two-dimensional image as previously described. The navigational map and background and the graphical representation of the aircraft has been omitted for ease of illustration. The altitude tiers may be displayed with a visually distinguishable characteristic in the same manner as previously described.

It is to be understood that as the display processor is configured to receive information regarding flap and gear position from the avionics sensors as well as aircraft altitude, position, FMS procedure selection, etc., the display processor may be configured to discontinue generating the images with visually distinguishable characteristics or outputting alerts when the aircraft is intentionally flown as part of a published procedure below the minimum altitude values (e.g., for landing). However, if the pilot is off-course, the display processor is configured to generate the images with visually distinguishable characteristics and/or output alerts as previously described.

It is to be appreciated that systems and methods are provided for displaying integrated minimum vectoring and safe altitude information on a display device in an aircraft. The aircraft operator gains heightened situational awareness by being aware of the specific minimum altitude value for the specific altitude vector in which the aircraft is flying, thereby permitting independent verification of an ATCO vectoring instruction, increasing the time for and potential of obstacle and terrain avoidance, and improving flight safety.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for displaying integrated minimum vectoring and safe altitude information on a display device in an aircraft, the method comprising:
    displaying a graphical representation of a safe altitude sector on the display device, the safe altitude sector corresponding to a first geographic area having a designated minimum safe altitude value associated therewith;
    displaying a graphical representation of a vectoring altitude sector on the display device, the vectoring altitude sector corresponding to a second geographic area having a designated minimum vectoring altitude value associated therewith that is below the designated minimum safe altitude value; and
    displaying a graphical representation of the aircraft on the display device within at least one of the following:
        the graphical representation of the safe altitude sector to indicate a current location of the aircraft and the minimum safe altitude value associated therewith; and
        the graphical representation of the vectoring altitude sector to indicate the current location of the aircraft and the minimum vectoring altitude value associated therewith, wherein the graphical representation of the safe altitude sector comprises a MSA image of the safe altitude sector and the graphical representation of the vectoring altitude sector comprises a MVA image of the vectoring altitude sector.

2. The method of claim 1, wherein if the first and second geographic areas have a common region, the method further comprising the step of overlapping a portion of the graphical representation of the safe altitude sector over a portion of the graphical representation of the vectoring altitude sector, the overlapping portions corresponding to the common region.

3. The method of claim 1, further comprising:
  displaying the graphical representation of the safe altitude sector using a first visually distinguishing characteristic if the aircraft is determined to be at risk of descending below the designated minimum safe altitude level for the safe altitude sector in which the aircraft is currently located;
  displaying the graphical representation of the vectoring altitude sector to which the aircraft is heading using a second visually distinguishing characteristic to indicate that the aircraft is below the designated minimum safe altitude for the safe altitude sector in which the aircraft is currently located and the aircraft is determined to be at risk of descending below the designated minimum vectoring altitude level for the vectoring altitude sector to which the aircraft is heading; and
  displaying the graphical representation of the vectoring altitude sector in which the aircraft is currently located using a third visually distinguishing characteristic to indicate that the aircraft is below the designated minimum vectoring altitude level for the vectoring altitude sector in which the aircraft is currently located.

4. The method of claim 3, wherein the aircraft is determined to be at risk of descending below the designated minimum safe and minimum vectoring altitudes using at least one of the following: current altitude, position, and trajectory.

5. The method of claim 3, wherein at least one of the first visually distinguishing characteristic, the second visually distinguishable characteristic, or the third visually distinguishable characteristic is selected from the group consisting of: color, hue, tint, brightness, texture, pattern, contrast, transparency, opacity, animation, and combinations thereof.

6. The method of claim 3, further comprising the step of providing an audible alert, a text alert, or both, if the current location of the aircraft is within the vectoring altitude sector and the current altitude is below the designated minimum vectoring altitude value for the vectoring altitude sector.

7. The method of claim 1, wherein the steps of displaying a graphical representation of the safe altitude sector and displaying a graphical representation of the vectoring altitude sector comprise orienting the graphical representations with a heading of the aircraft.

8. The method of claim 1, further comprising displaying a terrain map associated with an instantaneous location of the aircraft on the display device, wherein the graphical representations of the safe altitude sector and the vectoring altitude sector are displayed overlying the terrain map.

9. The method of claim 1, wherein the graphical representations of the safe altitude sector and the vectoring altitude sector comprise two-dimensional graphical representations or three-dimensional graphical representations.

10. The method of claim 3, further comprising the step of removing the graphical representation of the safe altitude sector if the aircraft is below the designated minimum vectoring altitude level for the vectoring altitude sector in which the aircraft is currently located.

11. A system for displaying integrated minimum vectoring and safe altitude information on a display device in the aircraft, the system comprising:
  a display device;
  a data storage device containing a database with minimum vectoring altitude information and minimum safe altitude information;
  a display processor in operable communication with the display device and coupled to the data storage device to receive the minimum vectoring altitude information and the minimum safe altitude information and configured, in response thereto to:
    generate a graphical representation of a safe altitude sector;
    generate a graphical representation of a vectoring altitude sector;
    generate a graphical representation of the aircraft within at least one of the following:
    the graphical representation of the safe altitude sector to indicate a current location of the aircraft and the minimum safe altitude value associated therewith; and
    the graphical representation of the vectoring altitude sector to indicate the current location of the aircraft and the minimum vectoring altitude value associated therewith, wherein the graphical representation of the safe altitude sector comprises a MSA image of the safe altitude sector and the graphical representation of the vectoring altitude sector comprises a MVA image of the vectoring altitude sector.

12. The system of claim 11, wherein the display processor is configured to overlap a portion of the graphical representation of the safe altitude sector over a portion of the graphical representation of the vectoring altitude sector, the overlapping portions corresponding to a common geographic region.

13. The system of claim 11, wherein the display processor is further configured to:
  display the graphical representation of the safe altitude sector using a first visually distinguishing characteristic if the aircraft is determined to be at risk of descending below the designated minimum safe altitude level for the safe altitude sector in which the aircraft is currently located;
  display the graphical representation of the vectoring altitude sector using a second visually distinguishing characteristic to indicate that the aircraft is below the designated minimum safe altitude for the safe altitude sector in which the aircraft is currently located and the aircraft is determined to be at risk of descending below the designated minimum vectoring altitude level for the vectoring altitude sector to which the aircraft is heading; and
  display the graphical representation of the vectoring altitude sector using a third visually distinguishing characteristic to indicate that the aircraft is below the designated minimum vectoring altitude level for the vectoring altitude sector in which the aircraft is currently located.

14. The system of claim 13, wherein the display processor is further configured to output an alert to further indicate that the aircraft is below the designated minimum vectoring altitude level for the vectoring altitude sector in which the aircraft is currently located.

15. The system of claim 13, wherein the aircraft is determined to be at risk of descending below the designated minimum safe and minimum vectoring altitudes using at least one of the following: current altitude, position, and trajectory.

16. The system of claim 13, wherein at least one of the first visually distinguishing characteristic, the second visually distinguishable characteristic, or the third visually distinguishable characteristic is selected from the group consisting of: color, hue, tint, brightness, texture, pattern, contrast, transparency, opacity, animation, and combinations thereof.

17. The system of claim 11, wherein the display processor is configured to orient the graphical representations of the safe altitude sector and the vectoring altitude sector with a heading of the aircraft.

18. The system of claim 11, wherein the display processor is further configured to display a terrain map associated with an instantaneous location of the aircraft on the display device, wherein the graphical representations of the safe altitude sector and the vectoring altitude sector are displayed overlying the terrain map.

19. The system of claim 11, wherein the display processor is further configured to display two-dimensional graphical representations or three-dimensional graphical representations of the safe altitude sector and the vectoring altitude sector.

20. An aircraft flight display device having rendered thereon a graphical display of a navigational map associated with a current location of an aircraft, the graphical display comprising:
- a MSA image of a safe altitude sector overlying the navigational map that corresponds to a first geographic area having a minimum safe altitude value;
- a MVA image of a vectoring altitude sector that corresponds to a second geographic area having a minimum vectoring altitude value, a portion of the safe altitude sector overlapping a portion of the vectoring altitude sector if there is a common geographic region in the first and second geographic areas, the overlapping portions corresponding to the common geographic region; and
- an aircraft image within at least one of the graphical display of the safe altitude sector or the vectoring altitude sector overlying the navigational map, the aircraft image being positioned such that its position corresponds to the current location of the aircraft, wherein:
- the MSA image of the safe altitude sector is displayed with a first visually distinguishing characteristic if the aircraft is determined to be at risk of descending below the designated minimum safe altitude level for the safe altitude sector in which the aircraft is currently located;
- the MVA image of the vectoring altitude sector to which the aircraft is heading is displayed with a second visually distinguishing characteristic to indicate that the aircraft is below the designated minimum safe altitude for the safe altitude sector in which the aircraft is currently located and the aircraft is determined to be at risk of descending below the designated minimum vectoring altitude level for the vectoring altitude sector to which the aircraft is heading; and
- the MVA image of the vectoring altitude sector in which the aircraft is currently located is displayed using a third visually distinguishing characteristic to indicate that the aircraft is below the designated minimum vectoring altitude level for the vectoring altitude sector in which the aircraft is currently located.

* * * * *